United States Patent [19]
Oliver

[11] Patent Number: 4,890,643
[45] Date of Patent: Jan. 2, 1990

[54] BI-DIRECTIONAL SEALING VALVE

[75] Inventor: John P. Oliver, Houston, Tex.

[73] Assignee: Mogas Industries, Inc., Houston, Tex.

[21] Appl. No.: 306,692

[22] Filed: Feb. 6, 1989

Related U.S. Application Data

[63] Continuation-in-part of Ser. No. 201,635, Jun. 2, 1988, abandoned.

[51] Int. Cl.⁴ ............................................. F16K 25/00
[52] U.S. Cl. .............................. 137/614.11; 137/637.1
[58] Field of Search ................... 137/613, 614, 614.01, 137/614.11, 614.21, 637.1; 251/367

[56] References Cited

U.S. PATENT DOCUMENTS

| | | | |
|---|---|---|---|
| 804,377 | 11/1905 | Campbell et al. | 137/614.11 X |
| 2,520,288 | 8/1950 | Shand et al. | 251/113 |
| 2,872,216 | 2/1959 | Kaiser | 284/9 |
| 2,890,017 | 6/1959 | Shafer | 251/367 X |
| 3,281,112 | 10/1966 | Walker | 251/174 |
| 3,509,913 | 5/1970 | Lewis | 137/614 |
| 3,528,447 | 9/1970 | Kolb | 137/614.11 X |
| 4,020,864 | 5/1977 | Church, Jr. | 137/242 |
| 4,410,165 | 10/1983 | Koch | 251/174 |
| 4,416,305 | 11/1983 | Commette et al. | 137/614 |
| 4,429,711 | 2/1984 | Sabomer | 137/637.1 X |
| 4,566,489 | 1/1986 | Knapp et al. | 137/614 |
| 4,576,234 | 3/1986 | Upchurch | 166/319 |
| 4,577,659 | 3/1986 | Gembus et al. | 137/614.01 X |
| 4,658,978 | 4/1987 | Ikematsu et al. | 251/174 |
| 4,660,591 | 4/1987 | Brown et al. | 137/312 |
| 4,687,016 | 8/1987 | Takahashi | 137/240 |

FOREIGN PATENT DOCUMENTS 2019972 11/1979 United Kingdom ................. 137/614

OTHER PUBLICATIONS

Mogas Industries, Inc. Brochure, "Type C-1 Metal-to-Metal Ball Valves", Mogas Industries, Inc. Brochure and Cross Sectional View.
Valvtron Photograph and Cross Sectional View.

Primary Examiner—John Fox
Attorney, Agent, or Firm—Vaden, Eickenroht, Thompson & Boulware

[57] ABSTRACT

There is disclosed a bi-directional sealing valve having a pair of ball type closure members mounted in the flowway through the body of the valve, one to control flow in one direction and the other to control flow in the opposite direction.

5 Claims, 3 Drawing Sheets

BI-DIRECTIONAL SEALING VALVE

This application is a continuation-in-part of my copending application, Ser. No. 201,635, filed June 2, 1988, and entitled "Bi-Directional Sealing Valve" now abandoned.

This invention relates generally to a bi-directional sealing valve. More particularly, it relates to improvements in a valve of this type having a pair of ball type closure members mounted in a flow way through the body of the valve each for controlling flow in a direction opposite that controlled by the other.

In a prior valve of this general type, a ball type closure member is mounted within the flow way between a metal seat on the valve body about the flowway on one side and the seating surface of a metal ring yieldably urged against the opposite side of the closure member by a Belleville spring within a pocket or recess about the flowway. More particularly, the closure member is rotated between opened and closed positions by an operating stem mounted on the body and having a tongue and groove connection to the closure member which permits the closure member to "float" in an axial direction when in its closed position. This construction avoids adverse loading on the stem and stem packing and also compensates for expansion and contraction under varying temperature conditions. The valve body includes a first body member having a cavity in which the closure member and ring are received and on which the stem is mounted, and a second body member which is releasably connected to the first member to close the cavity and on which the seating surfaces are formed.

In the event debris in the flowway accumulates between the ring and the end face of the pocket in the body cavity in which the seat ring is carried, the valve is either incapable of controlling flow or in any case capable of holding only low pressure in a direction from the opposite side of the closure member. Hence, it has been proposed to provide a valve of this general type having a pair of such ball closure members, one arranged in the body flowway to control flow in one direction and the other arranged therein to control flow in the opposite direction, and both yieldably urged into engagement with a seating surface formed on the valve body. More particularly, in order to minimize the end-to-end dimensions of the valve, the closure members are mounted within cavities formed in the flowway of a central valve body member and outer body members are releasably connected to the central body member to close the cavities in its opposite ends and thus contain the closure members and seat rings therein.

A valve of this construction insures a reliable, high pressure seal in each direction—namely, toward the side of the closure member engaged with the seating surface. Thus, each of the seat rings may serve as a redundant seal to control flow in the opposite direction, or in any case serve as a guide and maintain one side of the closure member in tight engagement with the seating surface on the valve body. However, whether the seating surfaces are formed on opposite ends of the central body member or the inner ends of the outer body members, it is time consuming and expensive to replace them. That is, it's necessary to either provide on site equipment for doing so or transport the body member or body members to a remote fascility for this purpose.

The primary object of this invention is to provide a valve having a pair of closure members of the type above described which enables these sealing surfaces to be relapped or replaced without such time and expense.

This and other objects are accomplished, in accordance with the illustrated embodiment of this invention, by a valve of the type described in which the body comprises a pair of outer body members each having an end portion of the flowway therein and an inwardly opening cavity in which a ball is received, and a central body member having a central portion of the flowway formed therein and including a plate disposed between the outer body members and means providing metal seating surfaces on opposite sides of the plate for engaging the inner sides of the ball closure members.

Each of the stems is rotatably mounted in an outer body member and releasably connected to the closure member in the cavity thereof by a tongue and groove which permits the closure member to move axially of the flowway when in its closed position. Also, a means is carried within the flowway between the outer end of the cavity of each outer body member and the outer side of the closure member within the cavity for yieldably engaging the inner side of the ball closure against the seating surface on one side of the central body member.

More particularly, the outer body members are releasably connected directly to one another to hold inner end surfaces of the body members against the outer side surfaces of the plate of the central body member, and, upon release of the connection between the outer body members, the central body member may be removed from between them and the closure members may be removed from within the outer body members. Due to its relatively small size, the central body member may be replaced by another central body member having properly lapped seating surfaces formed thereon at relatively minor expense, at least as compared with the expense of replacing the other body members on which the sealing surfaces might be formed. In fact, it is contemplated that due to its small size, the central body member, or at least the seating surfaces thereof, may be made of hard metal which is highly resistant to corrosion, an option which would be totally impractical in the event it were necessary to replace a larger body member of the construction previously described. In accordance with one embodiment of the invention, the seating surfaces of the central body member may be formed on annular portions which are integral with and extend from opposite sides of the plate and which fit closely within the cavities in the adjacent outer body members to hold them axially aligned with the closure members. In an alternative embodiment, the seating surfaces are formed on seat rings which are separate from the plate and on opposite sides thereof for fitting closely within the cavities in the adjacent outer body members, and means are provided on the outer body members and plate of the central body member for holding the central portion of the flowway in the plate axially aligned with the seat rings.

In the drawings, wherein like reference characters are used throughout to indicate like parts:

Figure 1:
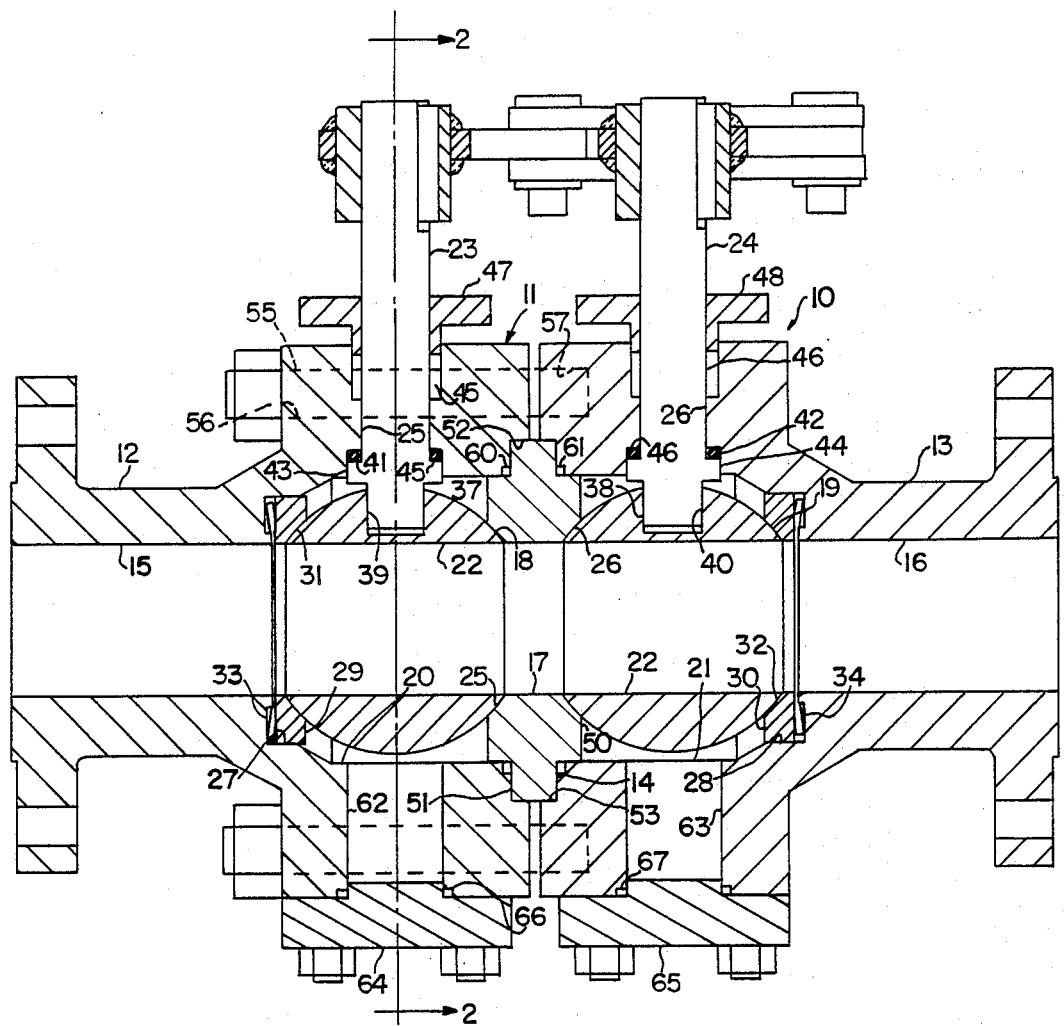
FIG. 1 is a longitudinal sectional view of a valve constructed in accordance with the first described embodiment of the present invention and showing the ball closure members thereof in open positions.
Figure 2:
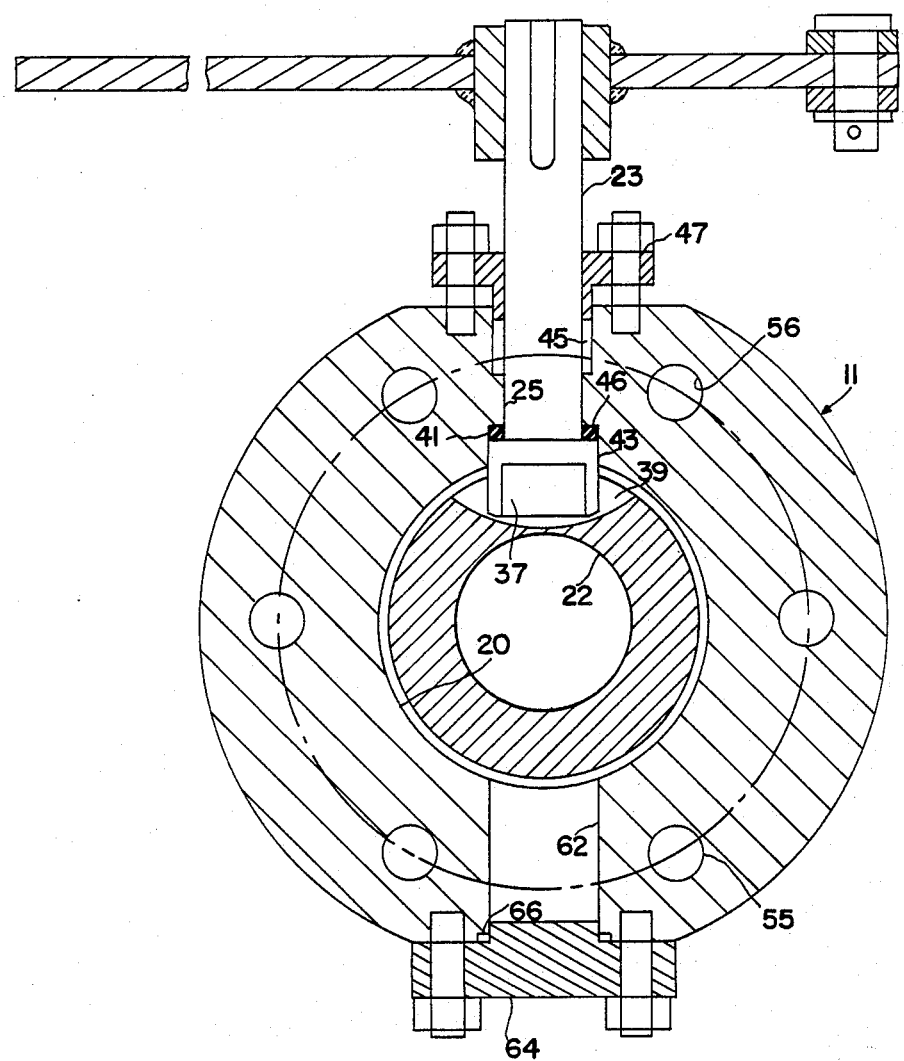
FIG. 2 is a vertical sectional view of the valve of FIG. 1, as seen along broken lines 2—2 of FIG. 1.

With reference now to the details of the above-described drawings, the valve embodiment of FIGS. 1 and 2, which is indicated in its entirety by reference character 10, is shown to comprise a valve body 11 made up of outer body members 12 and 13 and a central body member 14 between them. The valve body has a flowway therethrough made up of end portions 15 and 16 in the outer body members 12 and 13, respectively, and a central portion 17 in the central body member 14. Each of the outer body members has a flange on its outer end to permit the valve to be connected in a flowline.

The valve further includes a pair of ball closure members 18 and 19 mounted within cavities 20 and 21 in the outer body members 12 and 13, respectively, on opposite sides of the central body member 14. Each of the ball closure members has a port 22 therethrough which forms a continuation of the outer end and central portions of the flowway formed in the valve body when the balls are in the open position shown in the drawings. Upon rotation of the ball closure members 90°, their ports 22 extend transversely of the body flowway to close same.

In a manner to be described, the central body member 14 is held between the inner sides of the outer body members 12 and 13 to maintain its central flowway portion 17 axially aligned with the outer ends of the flowway in the outer body members as well as the ports 22 through closure members.

The ball closures 18 and 19 are rotated between their open and closed positions by means of stems 23 and 24 received within openings through the top sides of the outer body members to rotatably connect their inner ends with the top sides of the ball closure members received in the cavities of the outer body members. The outer ends of the stems are connected to a suitable operator, as shown, for simultaneously rotating the stems and thus moving the ball closure members between opened and closed positions.

The opposite sides of the central body member have spherical seating surfaces 25 and 26 formed thereon for engaging, respectively, with the inner sides of the ball closure members 18 and 19. The end cavities in the outer body members 12 and 13, respectively, in which the ball closures 18 and 19 are received are counterbored to form pockets or recesses 27 and 28 in which seat rings 29 and 30 are closely received, and spherically shaped seating surfaces 31 and 32 are formed on the inner sides of the rings for engaging the outer sides of the ball closure elements opposite the seating surfaces 25 and 26. More particularly, Belleville type springs 33 and 34 are disposed within the pockets outwardly of the seats so as to urge each of the seats inwardly against the outer sides of the ball closure members 18 and 19, respectively, and thus the closure members against the seating surfaces on the central body member.

The inner ends of the stems 23 and 24 are connected to the closure members 18 and 19 by means of tongues 37 and 38 which fit closely within grooves 39 and 40 formed in the top sides of the ball closure members. More particularly, and as best shown in FIG. 1, the tongues and grooves extend transversely to the ports through the ball closures so as to extend axially of the flowway through the valve body when the ball closure are in closed positions, thus permitting the ball closures to float in a direction axially of the flowway in such positions. The stem openings 25 and 26 are counterbored to provide inwardly facing annular shoulders 4 and 42, and the stems 23 and 24 are provided with annular enlargements 43 and 44 which form annular shoulders facing oppositely to the inwardly facing shoulders on the outer body sections. Metal seal rings 45 and 46 are disposed between the shoulders to absorb axial thrust on the stems. The stems 23 and 24 are surrounded by stem packings, each of which is received in a counterbore in the upper ends of the openings 25 and 26 and held down by glands 47 and 48 bolted to the top sides of the outer body members.

The central body member 14 comprises a relatively thin plate 51 which is held between the outer body members and integral annular portions 50 which extend from each side of the plate and which have outer ends on which the seating surfaces 25 and 26 are formed. The outer diameters of the annular portions 50 fit closely within the cavities in the outer body members so as to axially align the central portion of the flowway with the closure members and end flowway portions in the outer body members. The opposite sides of the outer periphery of the plate fit within counterbores 52 and 53 formed in the inner sides of the outer body members adjacent the inner ends of the cavities 20 and 21 therein. More particularly, the plate 51 is somewhat thicker than the radial extents of the counterbores 52 and 53 so that the inner faces of the outer body members disposed about the plate remain spaced apart. This space also permits the width of the flange to be reduced in the event it is necessary to compensate for relapping of the seating surfaces of the central body portion, which, without such compensation, would upset the spacing of the seating surfaces relative to the ball closures.

The outer body members are releasably connected directly to one another by means of bolts 55 which extend through a circle of holes 56 about the outer body member 12 and have their inner ends threadedly connected to a corresponding circle of tapped holes 57 formed within the inner side of the outer body member 13. Thus, upon makeup of the bolts with the outer body member, the inner sides or faces of the outer body members are drawn toward one another so as to be forced against the outer sides of the plate 51 of the central body section 14 so as to hold it between the outer body sections. Packing 60 and 61 is carried within recesses formed in the outer ends of the cavities of the outer body members so as to form a seal between the central body member and the outer body members.

Holes 62 and 63 are formed through the lower sides of the outer body members 12 and 13, respectively, in alignment with the stems in the top sides of the outer body members. More particularly, the holes 62 and 63 are of a size to permit that when the ball closure members are removed from within the cavities of the outer body sections, the stems to be passed therethrough into and out of their positions within the top openings of the outer body members. Thus, during assembly of the valve, and prior to disposal of the ball closures within their cavities, the stems may be moved upwardly into positions within the top openings within the outer body members, and the ball closures then are moved into the cavities when the ball closures and stems are in their closing positions. The lower ends of the openings 62 and 63 are closed by means of plates 64 and 65, respectively, bolted to the lower sides of the outer body members. Packing 66 and 67 is carried within recesses about the outer ends of the holes 62 and 63 to seal between the plates and the outer body members.

Upon disconnection of the bolts connecting the outer body members to one another, they may be moved apart to separate their inner sides a distance sufficient to permit the central body member 14 to be moved from between them. With the central body member removed, and the stems rotated to closing positions, the ball closure members may be moved axially out of engagement with the stems and between the inner faces of the outer body members to permit them to be removed along with the central body member. Upon removal of the ball closures, the seats, and if desired, the springs behind them, may also be removed from within the cavities of the outer body members.

In any event, removal of the central body member permits it to be replaced by another central body member having seating surfaces properly prepared for metal-to-metal sealing engagement with the inner sides of the ball closure members. Similarly, if required, the ball closure members may be removed along with the seat rings, as above described, to permit their repair or replacement.

Figure 3:
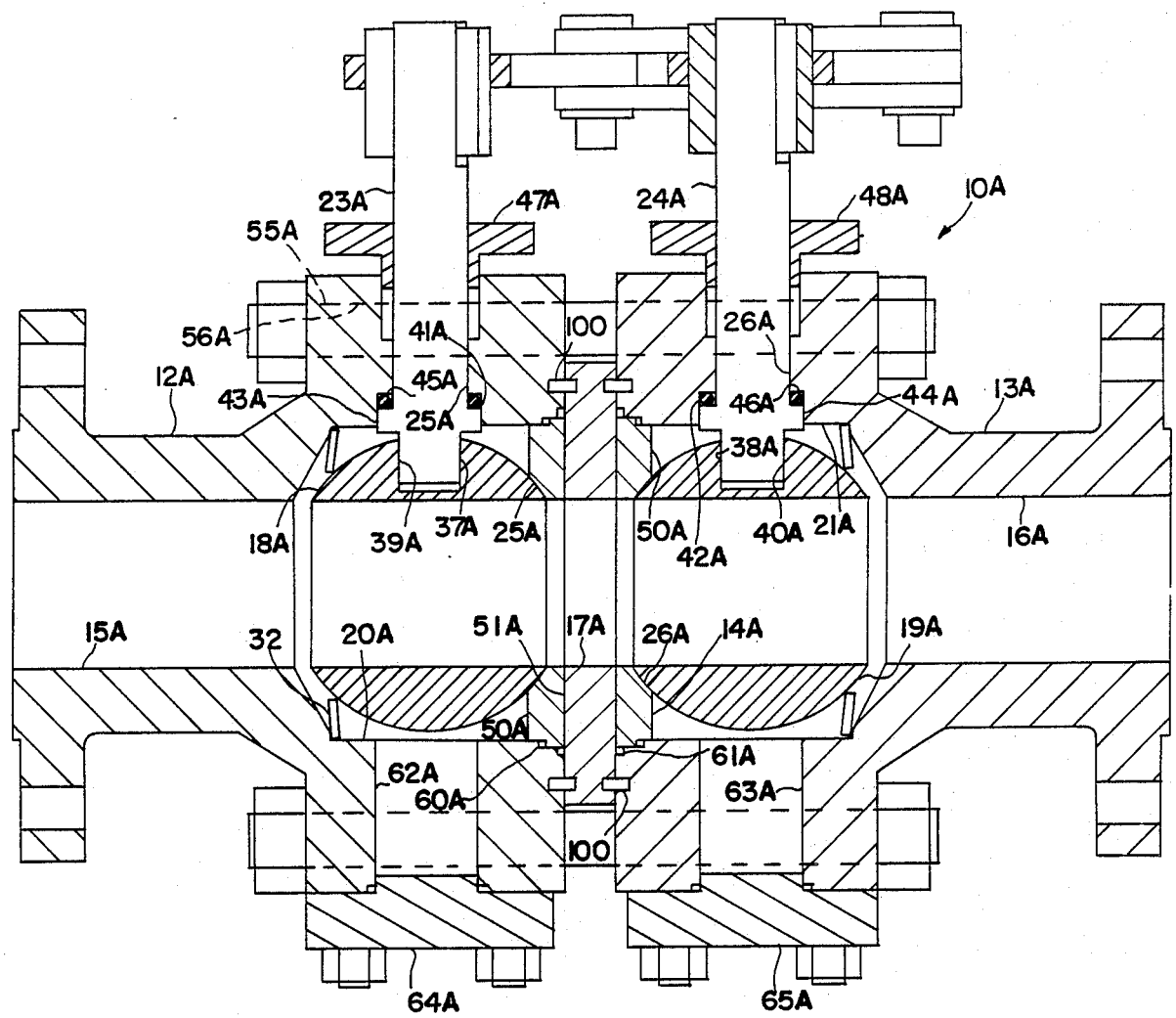
FIG. 3 is a longitudinal sectional view of a valve constructed in accordance with the second described embodiment of the invention.

As shown in FIG. 3, the second embodiment of the valve, which is indicated in its entirety by reference character 10A, is in many respects identical to the valve 10. Hence, corresponding parts carry corresponding reference characters except for the addition of the suffix "A".

One such difference resides in the fact that the seating surfaces 25A and 26A of the central body member 14A are formed on seat rings 50A which are separate from and disposable on opposite sides of plate 51A which is held between the outer body members 12A and 13A. Thus, the seat rings fit closely within the cavities in the outer body members to hold them axially aligned with the ball closures, and means are provided on the outer body members and central body member for holding the plate in such a position that the central flowway portion formed therein is axially aligned with the seat rings and thus the closure members. More particularly, as illustrated, dowel pins 100 fit within holes in the oppositely facing surfaces of the body members. Obviously, however, other means may be provided for so aligning the plate, such as, for example, close fitting counter bores in the end faces of the outer body members, as in the case of valve 10.

As shown, seal rings 60A and 61A are carried within grooves or recesses formed between the seat rings and outer and central body members so as to prevent line fluid from either bypassing the closure members when closed or escaping from within the body of the valve.

As previously mentioned, this alternative construction of the central body member enables the seat rings to be replaced or repaired separately of the plate. Also, it enables only the seat rings to be made of an especially expensive material.

The valve 10A also differs in the means by which the ball closures are yieldably urged against the seating surfaces of the central body member and held in a centered position within the cavities of the outer body members. Thus, as shown in FIG. 3, this means comprises a spring ring 32 which is engaged at its outer end with the end of the outer body member cavity and at its inner end with the outer side of the ball closure. As in the case of the seat rings of the valve 10, it serves to support the ball closure and thus maintain it axially aligned with the flowway through the valve body.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A bi-directional sealing valve, comprising
a body having a flowway therethrough,
a pair of ball type closure members each having a port therethrough and mounted for rotation within the valve body between positions opening and closing the flowway,
said body including a pair of outer body members each having an end portion of the flowway therein and an inwardly opening cavity in which a closure member is received, and
a central body member having a central portion of the flowway therein and including a plate disposed between the outer body members, and means providing metal seating surfaces on opposite sides of the plate for engaging the inner sides of the ball closure members,
means sealing between each outer body member and the central body member,
means carried within the flowway between the outer end of the cavity of each outer body member and the outer side of the closure member within the cavity for yieldably urging the inner side of the closure member against the seating surface on one side of the central body member,
a pair of stems each rotatably mounted on an outer body member and having a tongue and groove connection to the closure member in the cavity thereof to permit the closure member to move axially of the flowway in its closed position, and
means directly connecting the outer body members to one another to hold inner end surfaces of the outer body members tightly against outer side surfaces of the plate of the central body member,
said connecting means being releasable to permit the central body member to be removed from between the outer body members and the closure members to be removed from within the cavities of the outer body members.

2. A valve of the character defined in claim 1, wherein
the seating surfaces are formed on annular portions which are integral with and extend from each side of the plate and which fit closely within the cavities in the adjacent outer body member to hold them axially aligned with the closure members.

3. A valve of the character defined in claim 1, wherein
the seating surfaces are formed on seat rings which are separate from the plate and on opposite sides thereof for fitting closely within the cavities in the adjacent outer body members, and means are provided on the outer body members and plate of the central body member for holding the central portion of the flowway in the plate axially aligned with the seat rings.

4. A valve of the character defined in claim 1, wherein
said yieldably urging means includes a ring having its inner end urged by spring means against the outer side of the ball closure 5. A valve of the character defined in claim 1, wherein
the yieldably urging means comprises a spring ring engaging at one end with the outer end of the cavity and at the other end with the closure member.

* * * * *